United States Patent [19]

Suzuki

[11] Patent Number: 4,558,854

[45] Date of Patent: Dec. 17, 1985

[54] STEP BLOCK

[75] Inventor: Masakazu Suzuki, Ibaraki, Japan

[73] Assignee: Suzuki Iron Works Co., Ltd., Tokyo, Japan

[21] Appl. No.: 578,761

[22] Filed: Feb. 9, 1984

[30] Foreign Application Priority Data

Jun. 6, 1983 [JP] Japan ............................ 58-86237[U]

[51] Int. Cl.[4] ............................................... B23Q 3/00

[52] U.S. Cl. ....................................................... 269/93

[58] Field of Search ................................... 269/91-94, 269/239, 165, 95, 8, 276

[56] References Cited

U.S. PATENT DOCUMENTS

| | | | |
|---|---|---|---|
| 932,286 | 8/1909 | Jones | 269/94 |
| 1,084,352 | 1/1914 | Matthews et al. | 269/93 |
| 1,462,101 | 7/1923 | Colson | 269/91 |
| 2,758,514 | 8/1956 | Cadwallader | 269/93 |
| 3,105,330 | 10/1963 | Grage | 269/95 |
| 3,439,416 | 4/1969 | Yando | 269/8 |
| 3,711,929 | 1/1973 | Blakey et al. | 269/8 |
| 3,830,484 | 8/1974 | Bright et al. | 269/91 |
| 3,850,421 | 11/1974 | Orris | 269/91 |

FOREIGN PATENT DOCUMENTS

| | | | |
|---|---|---|---|
| 888296 | 12/1943 | France | 269/93 |
| 49-8521 | 2/1974 | Japan . | |

*Primary Examiner*—Robert C. Watson
*Attorney, Agent, or Firm*—Wenderoth, Lind & Ponack

[57] ABSTRACT

A step block supports the clamp arm of a clamp which is used to hold a workpiece to be machined. The step block has a generally right angled triangular configuration and has a saw-teeth portion on the inclined side. Each tooth of the saw-teeth portion is inclined upwards and outwards to positively support a complementary saw-teeth portion of the clamp arm. To provide a self-standing property to the step block, at least one permanent magnet and at least two yokes, interposing the permanent magnet between them and making contact with it, are received in a recess formed in a base surface of the step block, with the outer surfaces of the yokes being coplanar with the base surface.

2 Claims, 6 Drawing Figures

STEP BLOCK

BACKGROUND OF THE INVENTION

1. Field of the Invention

The present invention relates to a step block. The step block is used to secure an item of work (a material being processed during manufacture), a jig or the like on such surfaces as a surface plate or the like, wherein the step block serves as a supporting member of adjustable height for such device as a conventional clamp.

2. Description of the Prior Art

The present invention relates to improvements of the step block described in our Japanese Utility Model Publication No. 8521/1974. In that document, a step block is described which is a generally right angled triangular member and has a base surface portion, a vertical surface portion, and an inclined saw-teeth portion which forms about 60 degrees to the base surface portion and has a plurality of saw-like shaped teeth. Each tooth has a first surface which is inclined outwards and upwards by about 10–15 degrees relative to the horizontal plane or a plane parallel to the base surface portion and a second surface which is inclined upwards and outwards by about 10–15 degrees relative to the vertical plane or a plane parallel to the vertical surface portion, thereby forming a tooth angle of about 65 degrees. By forming the above mentioned teeth, the teeth mesh positively with complementarily shaped teeth formed on one end of an arm of the clamp. Thus, the disengagement of the teeth is prevented, and the step block has a sufficiently large load bearing capacity. The step block disclosed in the Utility Model is a combination of two right angled triangular step blocks. However, the step block is not necessarily triangular, and it is not necessary to combine it with a similar step block.

SUMMARY OF THE INVENTION

The object of the present invention is to provide a self standing property to the above mentioned step block.

According to the present invention, a step block is provided of the type including a base surface portion and a saw-teeth portion which is inclined generally at an angle of 60 degrees to the base surface portion and has a plurality of teeth of similar configuration, each tooth having a first surface which is inclined outwards and upwards by about 10–15 degrees relative to the base surface portion and a second surface which is inclined upwards and outwards by about 10–15 degrees relative to the vertical plane, which is perpendicular to the base surface, thereby forming a tooth angle of about 65 degrees, wherein the improvement comprises a recess formed in the base surface portion, at least one permanent magnet and at least two yokes of magnetic material received in the recess, the permanent magnet being interposed between the yokes, a bonding agent such as resin or the like for securing the permanent magnet and yokes in the recess with the bottom surfaces of the yokes being coplaner with the bottom surface portion, and one or more projections or grooves formed in the circumferential surface of the recess, thereby improving the adherence of the bonding agent.

The step block according to the invention can be located not only on a horizontal surface such as a surface plate but also on an inclined surface having any desired inclination such as the vertical surface of an angle plate or a tooling block. Further, the step block has a selfstanding property, and thus clamping operations for any item of work can very easily be performed.

Other features and advantages of the invention will appear more clearly from the following detailed description made with reference to the appended drawings given solely by way of example.

DESCRIPTION OF THE PREFERRED EMBODIMENT

Figure 1:
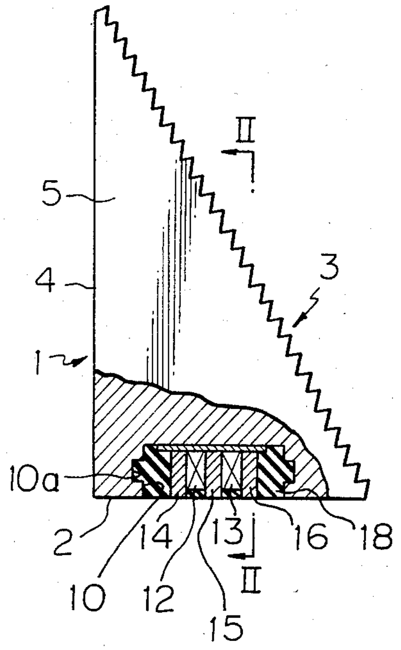
FIG. 1 is a partially sectioned elevational view of a step block, according to a preferred embodiment of the present invention.
Figure 4:
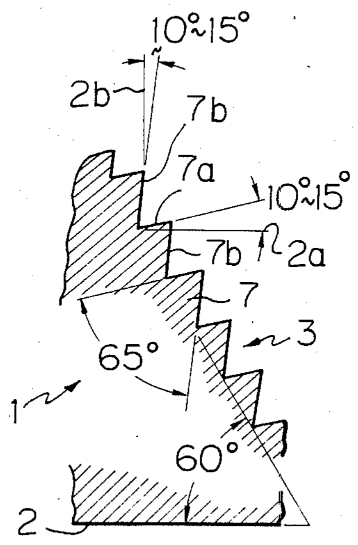
FIG. 4 is an enlarged partial sectional view of the saw-teeth portion of the step block shown in FIG. 1.

Referring to FIG. 1, a step block 1, according to the preferred embodiment of the present invention, is generally a right angled triangular member and includes a base surface portion 2, a saw-teeth portion 3, and three side surface portions 4, 5 and 6 which extend perpendicular to the base surface portion 2 or in the vertical direction. The saw-teeth portion 3 is generally inclined at an angle of 60 degrees to the base surface portion 2, as shown in FIG. 4. Each tooth 7 of the saw-teethed portion 3 includes a generally horizontal first surface 7*a* which extends by an angle of about 10–15 degrees in the upward and outward directions relative to the horizontal plane or to a plane 2*b* parallel to the base surface portion 2, and a generally vertical second surface 7*b* which extends by an angle of about 10–15 degrees in the upward and outward directions relative to the vertical plane 2*b* or to a surface which is perpendicular to the base surface portion 2. The angle defined between surfaces 7*a* and 7*b* constitutes the tooth angle of about 65 degrees. The teeth have a sufficiently large mechanical strength, and the engagement between complementarily shaped teeth is reliable and the load bearing capacity is sufficiently large.

Figure 2:
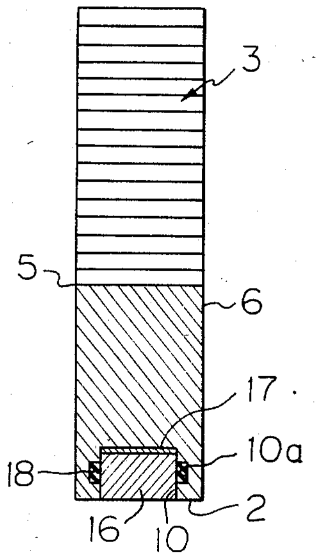
FIG. 2 is a sectional view along line II—II of FIG. 1.

According to the present invention as shown in FIG. 1, a recess 10 is formed in the base surface portion 2 of the step block 1 to receive therein two permanent magnets 12 and 13, preferably formed of ferrite, and yokes 14, 15, and 16 formed of magnetic material. The opposite surfaces of the permanent magnets 12 and 13 contact with the respective yokes 14, 15, and 16. Further as shown in FIG. 2, there is provided in the upper end of the recess 10 a plate 17 of magnetic material to contact with the upper ends of the permanent magnets and yokes respectively. The permanent magnets, the yokes, and the plates 17 are positioned and secured by resin 18. A groove 10*a* is formed in the circumferential wall of the recess 10 for improving the adherence between the recess 10 and the resin 18. The groove 10*a* may be substituted by any desired means for increasing the adherence between the recess 10 and the resin 18, such as a knurled surface, one or more projections, or the like. According to one feature of the invention, the bottom surfaces of the yokes 14, 15 and 16 are coplanar with the base surface 2.

Figure 3:
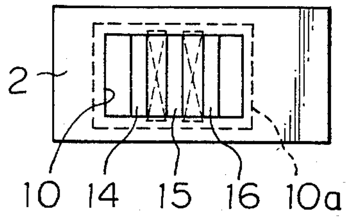
FIG. 3 is a bottom view of FIG. 1.

As shown in FIG. 3, the recess 10 has two pairs of opposite sides. The yokes 14, 15, and 16 extend in contact between one of the two pairs of opposite sides while the permanent magnets 12 and 13 therebetween extend beyond one of the two pairs of opposite sides into the circumferential groove 10*a* which increases the adherence of the resin 18 in the recess 10.

Figure 5:
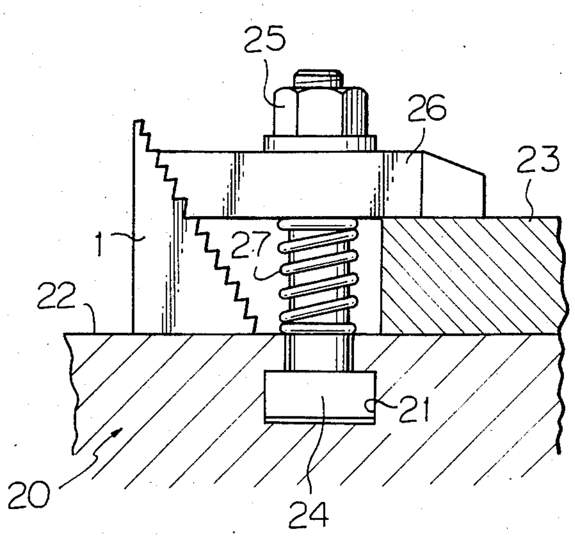
FIGS. 5 and 6 are side views illustrating operational states of the step block.
Figure 6:
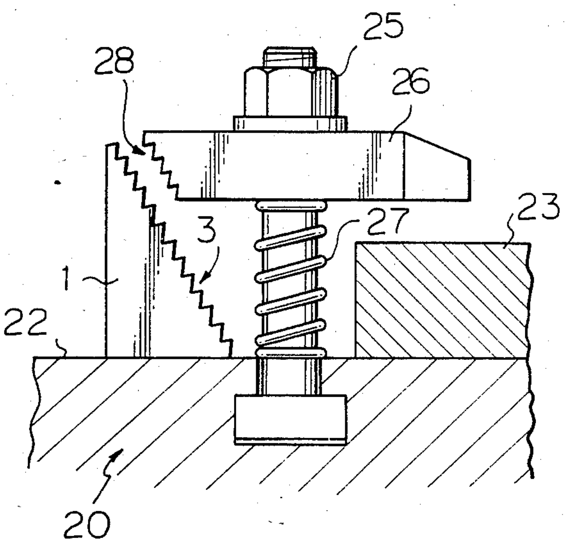

Operation of the step block 1 will be explained referring to FIGS. 5 and 6. On a surface 22 of such a device as a tooling block 20, the step block 1 is firmly mounted by the magnetic force of the permanent magnets. There is provided a T shaped groove 21 in the tooling block 20. A clamp consisting of a T shaped bolt 24 engaging with the groove 21, a nut 25 engaging with the bolt 24, a clamp arm 26, and a spring 27 is utilized to secure a workpiece 23 on the surface 22. As shown in FIG. 6, a saw-teeth portion 28 is formed on one end of the clamp arm 26 so that there is a plurality of teeth complementary with the teeth of the saw-teeth portion 3 of the step block 1. The height of the clamp arm 26 can easily be adjusted in correspondence to the height of the work 23, and thus the clamping operation is very easy and reliable.

As the step block 1 is attached on the surface 22 by the power of the magnetic force of the permanent magnet, the surface 22 may have any desired inclination such as vertical or the like. Therefore, preparatory operation of the machining process can be performed very easily and quickly.

What is claimed is:

1. A step block including a base surface portion and a saw-teeth portion which is inclined generally at an angle of 60 degrees to the base surface portion and has a plurality of teeth, each of the same dimensions and each having a first surface which is inclined upwards and outwards by about 10–15 degrees relative to a plane parallel to the base surface portion and a second surface which is inclined upwards and outwards by 10–15 degrees relative to a plane being perpendicular to the base surface portion, thereby forming a tooth angle of about 65 degrees, the improvement comprising:

a recess means being formed on the base surface portion and having a circumferential wall with two pairs of opposite sides;

at least one permanent magnet arranged in the recess means;

at least two yokes of magnetic material interposing the at least one permanent magnet between them, contacting said at least one permanent magnet, and extending in contact between one of the two pairs of opposite sides of the recess means, said at least two yokes having bottom surfaces coplanar with the bottom surface of the base surface portion;

resin means for securing the at least one permanent magnet and the at least two yokes in the recess means; and at least one means, formed in the circumferential wall of the recess means, for increasing the adherence between the resin means and the recess means.

2. A step block according to claim 1 wherein said at least one means for increasing the adherence between the resin means and the recess means is a groove formed in said circumferential wall of the recess means.

* * * * *